United States Patent [19]

Shima et al.

[11] Patent Number: 5,537,412
[45] Date of Patent: Jul. 16, 1996

[54] AUDIO-VISUAL NETWORK CONNECTION SYSTEM AND METHOD USING GATEWAYS

[75] Inventors: Hisato Shima, Chiba; Hiroshi Yamazaki; Kazuyuki Ogawa, both of Kanagawa; Harumi Kawamura, Tokyo, all of Japan

[73] Assignee: Sony Corporation, Tokyo, Japan

[21] Appl. No.: 590,073

[22] Filed: Jan. 17, 1996

Related U.S. Application Data

[63] Continuation of Ser. No. 339,572, Nov. 14, 1994, abandoned, which is a continuation of Ser. No. 90,935, Jul. 14, 1993, abandoned.

[30] Foreign Application Priority Data

Jul. 29, 1992 [JP] Japan .................................. 4-202310

[51] Int. Cl.⁶ .................................................... H04L 12/46
[52] U.S. Cl. ............................................................ 370/85.13
[58] Field of Search ........................... 370/85.14, 85.13, 370/94.1, 94.2, 94.3, 60, 60.1

[56] References Cited

U.S. PATENT DOCUMENTS

| | | | |
|---|---|---|---|
| 4,706,080 | 11/1987 | Sincoskie | 370/85.13 |
| 4,975,906 | 12/1990 | Takiyasu et al. | 370/85.13 |
| 5,081,621 | 1/1992 | Sugimoto | 370/85.13 |
| 5,214,646 | 5/1993 | Yacoby | 370/85.13 |
| 5,251,213 | 10/1993 | Videlock et al. | 370/85.13 |
| 5,321,695 | 6/1994 | Faulk, Jr. | 370/85.13 |
| 5,323,388 | 6/1994 | Chang et al. | 370/85.13 |
| 5,323,394 | 6/1994 | Perlman | 370/85.13 |
| 5,339,316 | 8/1994 | Diepstraten | 370/85.13 |

FOREIGN PATENT DOCUMENTS 0300350  1/1989  European Pat. Off. .

OTHER PUBLICATIONS

WIPO Application No. WO 87/01543 (Sincoskie) corresponds to U.S. Pat. No. 4,706,080 Mar. 12, 1987.
WIPO Application No. WO 87/05763 (Bione et al.) 24 Sep. 1987.

Primary Examiner—Douglas W. Olms
Assistant Examiner—Min Jung
Attorney, Agent, or Firm—Jay H. Maioli

[57] ABSTRACT

A network system wherein any device in all networks can be represented using addresses set in the individual networks without relying upon the concept of a network number is disclosed. A first network (①) includes first to third devices (A, B, C) to which the addresses of "1", "2" and "3" are allocated, respectively. A second network (②) includes first to third devices (D, E, F) to which the addresses of "1", "2" and "3" are allocated, respectively. A third network (③) includes first and second devices (G and H) to which the addresses "1" and "2" are allocated, respectively. The first and second networks (①, ②) are connected to each other by way of a gateway (GW1) for which the address 4 in the first network (1) and the address 5 in the second network (2) are allocated. The second and third networks (② and ③) are connected to each other by way of another gateway (GW2) for which the address 4 in the second network (2) and the address 3 in the third network (3) are allocated to build up a network system. A pass from within a network to another device in another network is represented in a compound representation using the addresses set in the individual networks. For example, the pass from the first device (A) in the first network ① to the second device (H) in the third network (③) is represented as "4.4.2".

9 Claims, 5 Drawing Sheets

| DESTINATION ADDRESS | SOURCE ADDRESS | MESSAGE |
|---|---|---|

FIG. 3

| FIG. 3A |
|---------|
| FIG. 3B |

FIG. 3A

- SEARCH FOR RECORDABLE MACHINE
- 101) A BROADCASTS "ASK ANY RECORDABLE MACHINE TO RESPOND"
- 102) RECORDABLE MACHINE C RESPONDS — RECORDABLE MACHINE C IS FOUND OUT (ADDRESS:3)
- 103) A BROADCASTS "ASK ANY GATEWAY TO RESPOND"
- 104) GATEWAY 1 RESPONDS (a)

| DESTINATION ADDRESS | SOURCE ADDRESS | MESSAGE | |
|---|---|---|---|
| φ | 1 | ASK ANY RECORDABLE MACHINE TO RESPOND | 201 |
| B.C. | A | BROADCAST (TO ALL DEVICES) | |
| 1 | 3 | THIS IS A RECORDABLE MACHINE | 202 |
| A | C | | |
| φ | 1 | ASK ANY GATEWAY TO RESPOND | 203 |
| B.C. | A | | |
| 1 | 4 | THIS IS A GATEWAY | 204 |
| A | GW1 | | |

AUDIO-VISUAL NETWORK CONNECTION SYSTEM AND METHOD USING GATEWAYS

This is a continuation of application Ser. No 08/339,572 filed Nov. 14, 1994, now abandoned which is a continuation of application Ser. No. 08/090,935 filed Jul. 14, 1993, now abandoned.

BACKGROUND OF THE INVENTION

1. Field of the Invention

This invention relates to a network system wherein a plurality of networks are interconnected by way of a gateway or gateways.

2. Description of the Related Art

In a LAN (local area network) system, each network has a device number allocated thereto. In short, each device can be represented by a network number and a host number in a network to which the device belongs. In order to perform communications between different networks, a routing table in which an address of an internetwork router for transferring a datagram to a network of an object host is stored must necessarily be provided.

In a computer network system, a network number may be set upon installation of a server, but in a consumer AV (audio and video) network system, it must be estimated that insertion or removal of a device into or from a network may take place frequently or a plurality of networks may be connected arbitrarily. In this instance, it is difficult to register a network number every time.

SUMMARY OF THE INVENTION

It is an object of the present invention to provide a network system wherein any device in all networks can be represented using addresses (relative addresses) set in the individual networks without relying upon the concept of a network number.

In order to attain the object described above, according to the present invention, there is provided a network system, which comprises a plurality of networks each including one or more devices, and one or more gateways for connecting the networks to each other, wherein a path from one device within one of the networks to a device in another one of the networks is represented using addresses allocated to the devices and the gateways individually in the networks.

In the network system, a path from one device within one of the networks to a device in another one of the networks is represented using the addresses allocated to the devices and the gateways individually in the networks, and accordingly, any device in the entire network system can be indicated using the addresses set in the individual networks without relying upon the concept of a network number. Consequently, it is not necessary to register a network number every time a network is connected.

Further, when viewed from any given one of the devices, a paths therefrom can be taken in a hierarchic manner, and no complicated routing control is required. Incidentally, routing control requires a table in which passes between different devices are stored, and when a device or devices are to be provided additionally, modification to the table or the like is required.

It is to be noted that the present invention is suitably applied to a system wherein the number of networks involved and the number of devices connected in each network are not too great such as a consumer audio and video network system. This is because, as the number of networks and the number of devices increase, the number of steps in a search procedure increases progressively, and consequently, the search is complicated and requires much time.

The above and other objects, features and advantages of the present invention will become apparent from the following description and the appended claims, taken in conjunction with the accompanying drawings in which like parts or elements are denoted by like reference characters.

DETAILED DESCRIPTION OF THE PREFERRED EMBODIMENT

Figure 1:
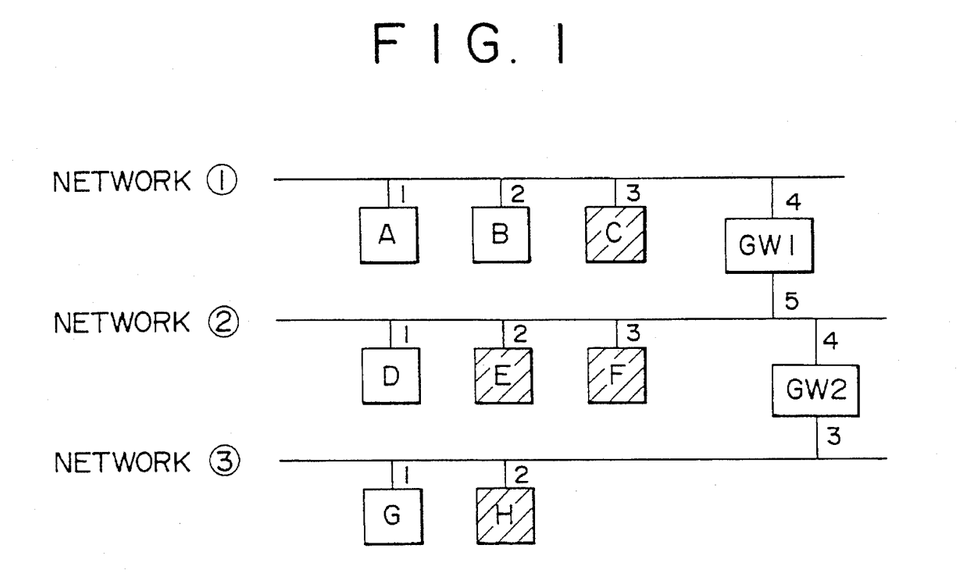
FIG. 1 is a block diagram showing a general construction of a network system to which the present invention is applied.

Referring first to FIG. 1, there is shown a general construction of a network system to which the present invention is applied. The network system shown includes three networks ①, ② and ③. In each of the networks ①, ② and ③, each device has a relative address allocated thereto.

The network ① includes three devices A, B and C to which the addresses of "1", "2" and "3" are allocated, respectively. The network ② includes three devices D, E and F to which the addresses of "1", "2" and "3" are allocated, respectively. Further, the network ③ includes two devices G and H to which the addresses "1", and "2" are allocated, respectively.

The networks ① and ② are connected to each other by way of a gateway GW1, and the networks ② and ③ are connected to each other by way of another gateway GW2. Also the gateways GW1 and GW2 have addresses of the respective associated networks allocated thereto. Here, the address of the gateway GW1 on the network 1 is "4"; the address of the gateway GW1 on the ② is "5"; the address of the gateway GW2 on the ② is "4"; and the address of the gateway GW2 on the network ③ is "3".

Figure 2:
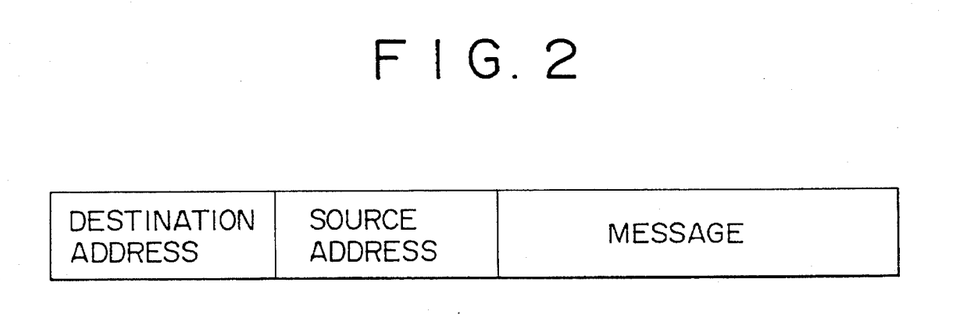
FIG. 2 is a diagrammatic view showing a construction of a packet for use with data communication in the network system.

FIG. 2 shows a construction of a packet for use with data communication. The packet shown is generally constituted of a destination address, a source address and a message.

Subsequently, a description will be given of how a path from one device within one of the networks to another certain device in another one of the networks in an attempt to search for the certain object in the entire network system is represented in the network system described above.

It is assumed that, for example, the device A makes a source of a video signal and tries to search for a device which can record a video signal. For such search, broadcasting (BC) in the network system is used. Here, the address to which broadcasting is directed is represented by ϕ. It is assumed here that the devices C, E, F and H indicated by slanting lines in FIG. 1 are devices which can record a video signal, that is, recordable machines.

Figures 3, 3A:
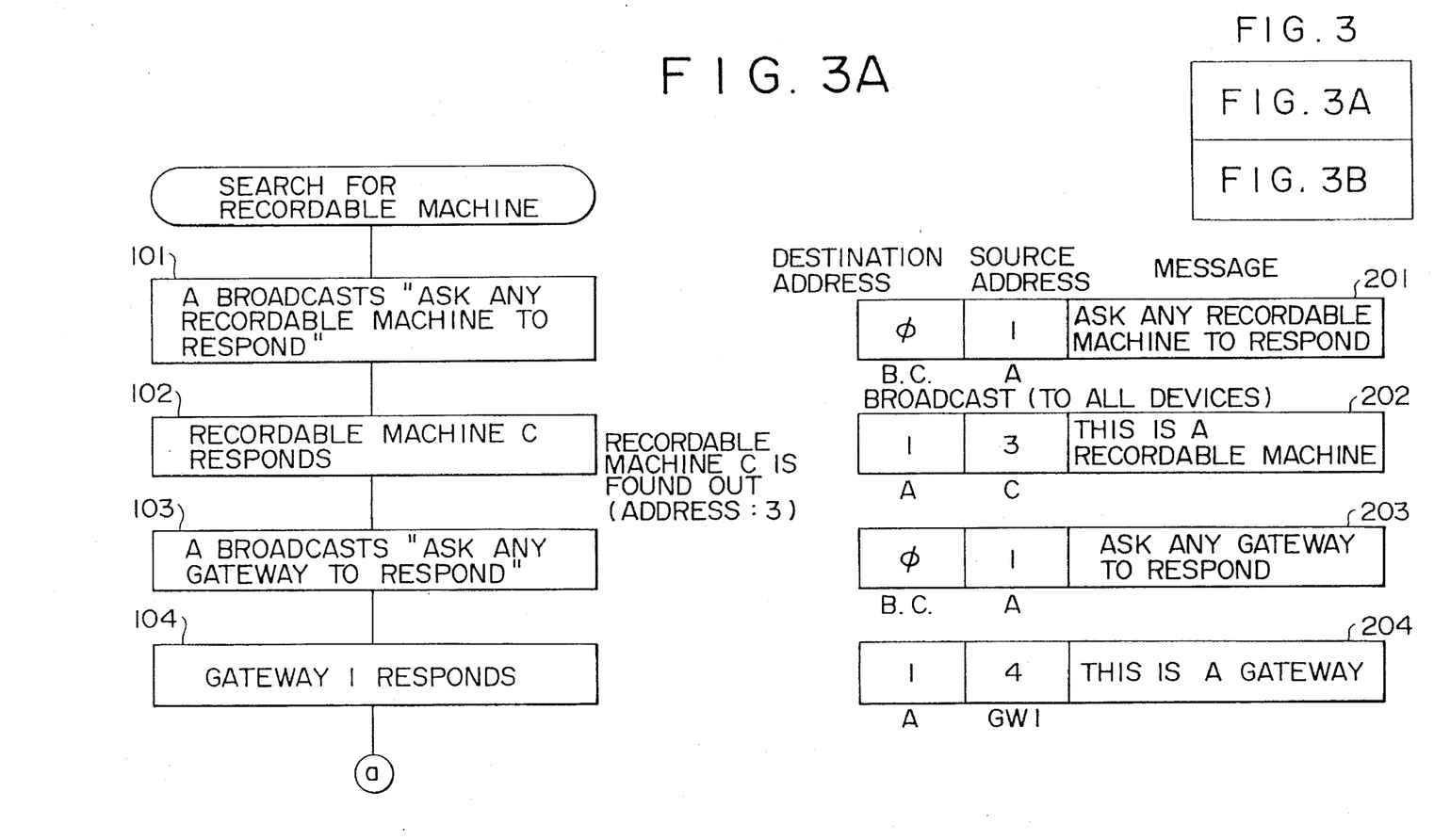
FIGS. 3A, 3B and 4A, 4B are flow diagrams illustrating a search procedure in the network system together with contents of communication in the procedure.
Figure 3B:
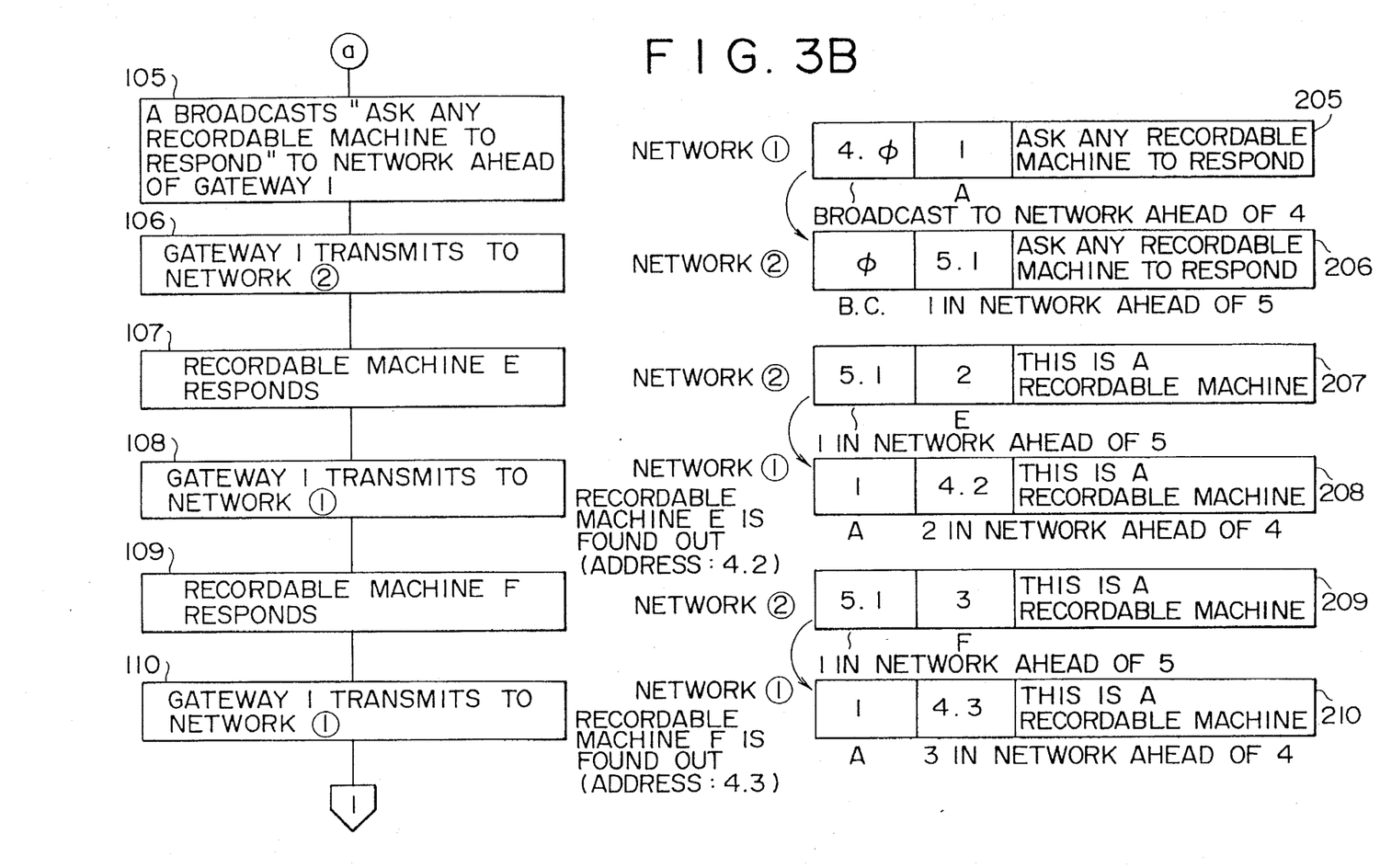
Figures 4, 4A:
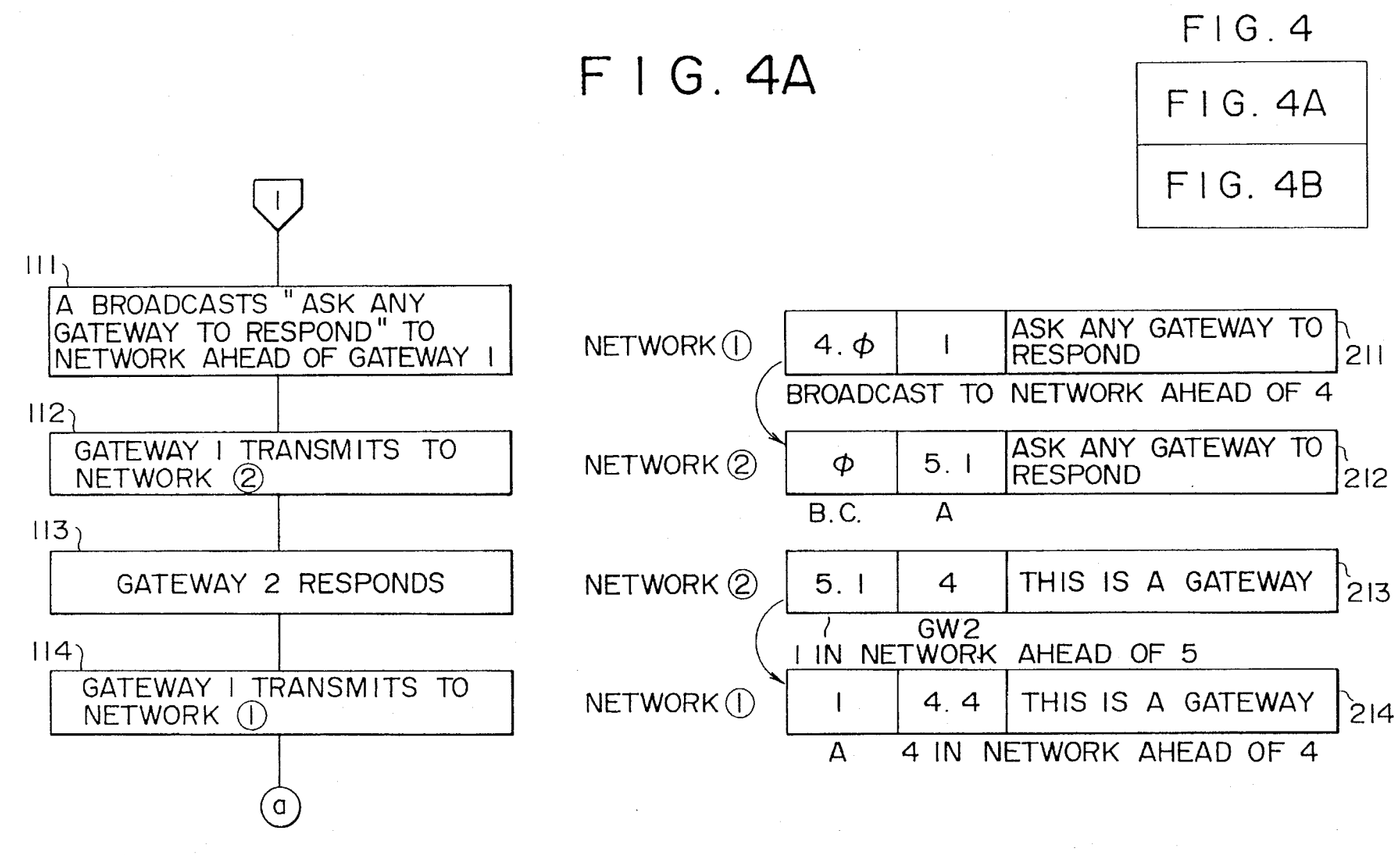

FIGS. 3 and 4 illustrate a search procedure and contents of communication in such search.

Referring first to FIG. 3, the device A first broadcasts "ASK ANY RECORDABLE MACHINE TO RESPOND" (step 101). The contents of communication then are "φ" for the destination address, "1" for the source address and "ASK ANY RECORDABLE MACHINE TO RESPOND" for the message (packet 201).

The device C in the network ① to which the device A belongs responds to the broadcast of the device A (step 102). The contents of communication then are "1", for the destination address, "3" for the source address and "THIS IS A RECORDABLE MACHINE" for the message (packet 202). Consequently, the device C is found to be as a recordable machine, and the address "3" indicates the path from the device A to the device C.

Then, the device A broadcasts "ASK ANY GATEWAY TO RESPOND" (step 103). The contents of communication then are "φ" for the destination address, "1", for the source address and "ASK ANY GATEWAY TO RESPOND" for the message (packet 203).

The gateway GW1 connected to the network ① to which the device A belongs responds to the broadcast of the device A (step 104). The contents of communication then are "1", for the destination address, "4" for the source address and "THIS IS A GATEWAY" for the message (packet 204).

In response to the gateway GW1, the device A then broadcasts "ASK ANY RECORDABLE MACHINE TO RESPOND" to the network ahead of the gateway GW1 (step 105). The contents of communication then are "4.φ" for the destination address, "1", for the source address and "ASK ANY RECORDABLE MACHINE TO RESPOND" for the message (packet 205).

In response to the broadcast of the device A, the gateway GW1 transmits it the broadcast to the network ② (step 106). The contents of communication then are "φ" for the destination address, "5.1" for the source address and "ASK ANY RECORDABLE MACHINE TO RESPOND" for the message (packet 206). In this manner, the gateway GW1 transmits the message modifying the destination address and the source address. Here, the address "5.1" represents the address "1" in the network ahead of the address "5". Such representation similarly applies in the following description.

The device E in the network ② responds to the packet (step 107). The contents of communication then are "5.1" for the destination address, "2" for the source address and "THIS IS A RECORDABLE MACHINE" for the message (packet 207).

In response to the response of the device E, the gateway GW1 transmits it the response to the network ① (step 108). The contents of communication then are "1" for the destination address, "4.2" for the source address and "THIS IS A RECORDABLE MACHINE" for the message (packet 208). In this manner, the gateway GW1 transmits the message modifies the destination address and the source address. Consequently, the device E is found to be a recordable machine, and the address "4.2" indicates the path from the device A of the network ① to the device E of the network ②. In this manner, the path is represented in a hierarchic representation.

Also the device F in the network ② responds to the transmission of the message from the gateway GW1 to the network ② at step 106 (step 109). The contents of communication then are "5.1" for the destination address, "3" for the source address and "THIS IS A RECORDABLE MACHINE" for the message (packet 209).

In response to the response of the device F, the gateway GW1 transmits the response to the network ① (step 110).

The contents of communication then are "1" for the destination address, "4.3" for the source address and "THIS IS A RECORDABLE MACHINE" for the message (packet 210). In this manner, the gateway GW1 transmits the message modifies the destination address and the source address. Consequently, the device F is found to be a recordable machine, and the address "4.3" indicates the path from the device A of the network ① to the device F in the network ② and is represented in a hierarchic representation.

Subsequently, referring now to FIG. 4, the device A broadcasts "ASK ANY GATEWAY TO RESPOND" to the network ahead of the gateway GW1 (step 111). The contents of communication then are "4.φ" for the destination address, "1" for the source address and "ASK ANY GATEWAY TO RESPOND" for the message (packet 211).

In response to the broadcast of the device A, the gateway GW1 transmits the broadcast to the network ② (step 112). The contents of communication then are "φ" for the destination address, "5.1" for the source address and "ASK ANY GATEWAY TO RESPOND" for the message (packet 212). In this manner, the gateway GW1 transmits the message and modifies the destination address and the source address.

The gateway GW2 connected to the network ② responds to the message (step 113). The contents of communication then are "5.1" for the destination address, "4" for the source address and "THIS IS A GATEWAY" for the message (packet 213).

In response to the response of the gateway GW2, the gateway GW1 transmits the response to the network ① (step 114). The contents of communication then are "1" for the destination address, "4.4" for the source address and "THIS IS A GATEWAY" for the message (packet 214). In this manner, the gateway GW1 transmits the message and modifies the destination address and the source address.

In response to the message, the device A broadcasts "ASK ANY RECORDABLE MACHINE TO RESPOND" to the network connected to the gateway GW2 (step 115). The contents of communication then are "4.4.φ" for the destination address, "1" for the source address and "ASK ANY RECORDABLE MACHINE TO RESPOND" for the message (packet 215).

Figure 4B:
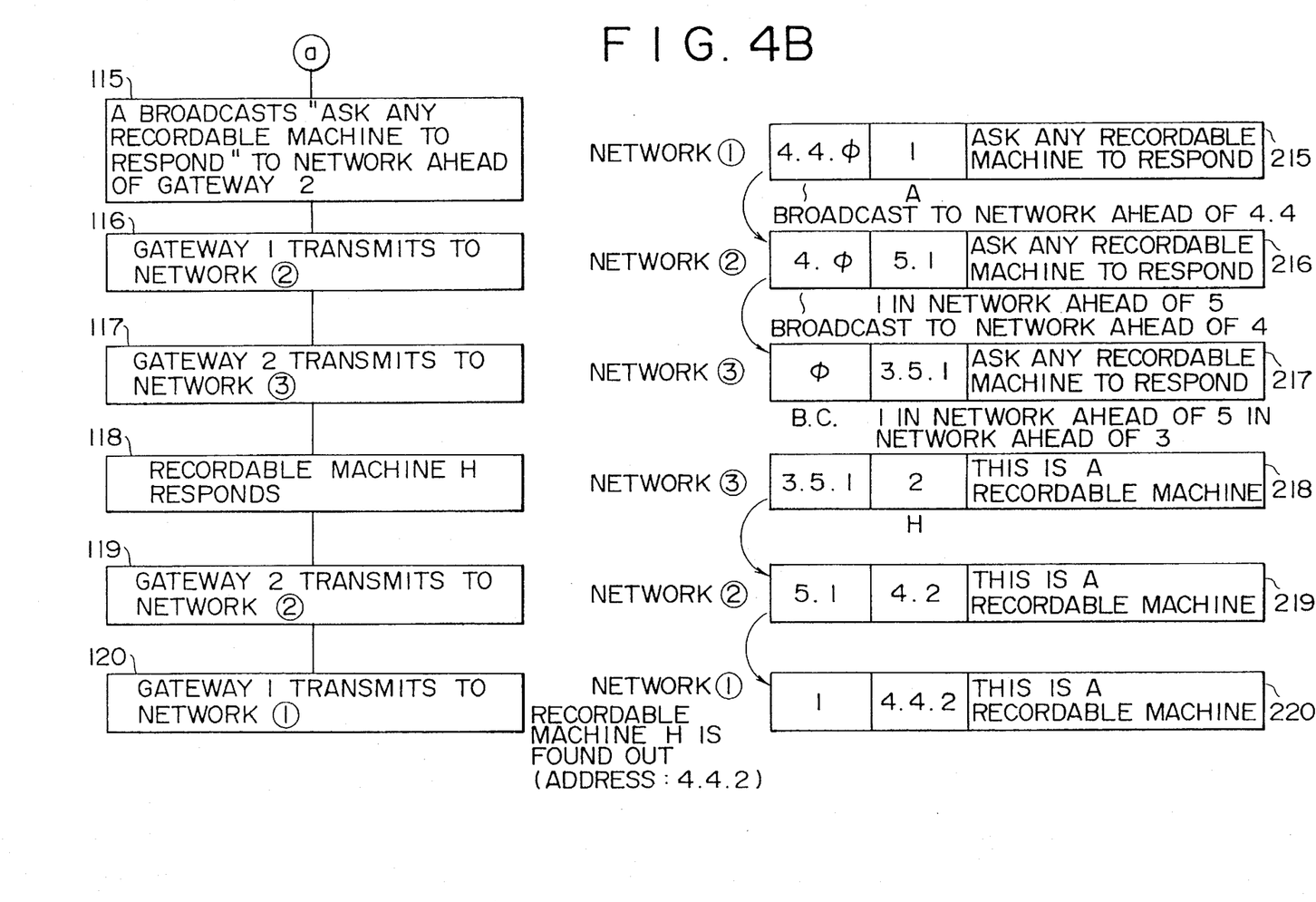

In response to the broadcast of the device A, the gateway GW1 transmits the broadcast to the network ② (step 116). The contents of communication then are "4.φ" for the destination address, "5.1" for the source address and "ASK ANY RECORDABLE MACHINE TO RESPOND" for the message (packet 216). In this manner, the gateway GW1 transmits the message and modifies the destination address and the source address.

In response to the message, the gateway GW2 transmits it to the network ③ (step 117). The contents of communication then are "φ" for the destination address, "3.5.1" for the source address and "ASK ANY RECORDABLE MACHINE TO RESPOND" for the message (packet 217). In this manner, the gateway GW2 transmits the message and modifies the destination address and the source address. Here, the address "3.5.1" indicates the address "1" of the network ahead of the address "5" of the network further ahead of the address "3". Such representation similarly applies to the following description.

The device "H" in the network ③ responds to the message (step 118). The contents of communication then are "3.5.1" for the destination address, "2" for the source address and "THIS IS A RECORDABLE MACHINE" for the message (packet 218).

In response to the response of the device H, the gateway GW2 transmits the response to the network ② (step 119).

The contents of communication then are "5.1" for the destination address, "4.2" for the source address and "THIS IS A RECORDABLE MACHINE" for the message (packet 219). In this manner, the gateway GW2 transmits the message and modifies the destination address and the source address.

In response to the message, the gateway GW1 transmits the message to the network ① (step 120). The contents of communication then are "1" for the destination address, "4.4.2" for the source address and "THIS IS A RECORDABLE MACHINE" for the message (packet 220). In this manner, the gateway GW1 transmits the message and modifies the destination address and the source address. Consequently, the device H is found to be a recordable machine, and the address "4.4.2" indicates the path from the device A of the network ① to the device H of the network ③. In this manner, the path is represented in a hierarchic representation.

The device A can find the devices C, E, F and H as recordable machines in such a manner as described above. In short, the device A can find out the addresses of and accordingly the path to the devices C, E, F and H.

It is to be noted that, while FIGS. 3 and 4 illustrate a search for a recording machine up to the network ③, a gateway of the network ③ is searched for after that. In this instance, since there is no response to the search, it is determined that there is no network connected ahead of the network ③ and the search is ended.

In this manner, in the network system of the present embodiment wherein the networks ① to ③ are connected to each other by way of the gateways GW1 and GW2, a path from one device within a network to a device in another network is represented in a hierarchic representation using addresses allocated to the devices and the gateways in the individual networks.

It is to be noted that the system configuration of the network system of the embodiment described above is a mere example and naturally the number of networks and the number of devices belonging to each network are not limited to those of the embodiment.

Having now fully described the invention, it will be apparent to one of ordinary skill in the art that many changes and modifications can be made thereto without departing from the spirit and scope of the invention as set forth herein.

What is claimed is:

1. An audio-visual network system, comprising:

a plurality of audio-visual networks, each network including one or more recording or reproducing devices connected thereto, each device having a pre-assigned relative address unique only within the network to which the device is connected, a first device being connected to one of said plurality of networks and a second device being connected to another one of said plurality of networks; and a plurality of gateways for connecting said plurality of networks in a serial fashion, each two adjacent networks being connected by a corresponding one of said plurality of gateways, ann each of said plurality of gateways connecting two adjacent networks having pre-assigned relative addresses unique only within said respective two adjacent networks connected by the gateway, a data path from said first device to said second device being represented by using said pre-assigned relative addresses of said respective first and second devices and said pre-assigned addresses of all respective gateways serially connecting said one and another one of said plurality of network, and said data path being identified without having to identify with which of said plurality of audio-visual networks any particular device is associated.

2. A network system according to claim 1, wherein each of said plurality of gateways has a function of modifying an address of a message passing between adjacent ones of said networks connected by the gateway.

3. A network system according to claim 1, wherein the representation of said data path which uses said pre-assigned relative addresses of said respective first and second devices and said pre-assigned relatives addresses of said all respective gateways serially connecting said one and another one of said plurality of networks is formed by placing said pre-assigned addresses in a pre-determined order.

4. A network system according to claim 1, wherein a source device searches for an object device by a broadcast to a predetermined broadcast address that is not associated with any device or gateway, said broadcast originating in one of said plurality of networks to which the source device is connected and travelling through remaining ones of said plurality of networks.

5. A network system according to claim 4, wherein prior to said broadcast to a destination device connected to another one of said plurality of networks, said source device searches for a gateway connected to said one of said plurality of networks to which said source device is connected.

6. A network system according to claim 5, wherein the search for said object device is ended when no response is detected as a result of the search for said gateway connected to said one of said plurality of networks to which said source device is connected.

7. An audio-visual network connection method comprising the steps of:

connecting a plurality of audio-visual networks in a serial fashion using a plurality of gateways, each network including one or more recording or reproducing devices connected thereto, each of said plurality of gateways connecting two adjacent ones of said plurality of networks and each two adjacent networks being connected by one of said plurality of gateways;

allocating relative addresses to said respective recording or reproducing devices and relative addresses to each of said plurality of gateways, the relative address allocated to the corresponding recording and reproducing device being unique only within the network to which the recording or reproducing device is connected and said relative addresses allocated to the corresponding gateway being unique only within said respective two adjacent networks which the gateway connects;

sending a first broadcast message to a predetermined broadcast address that is not associated with any device or gateway from a recording or reproducing device in a first network which requests any gateway to respond to said broadcast message;

sending a second broadcast message which requests a response from any recording or reproducing device in an adjacent network connected by a gateway responding to said first broadcast message which connects said first network and said adjacent network, said second broadcast message having an address comprising a relative address of said gateway responding to said first broadcast message and said predetermined broadcast address;

modifying said address of said second broadcast message by said gateway responding to said first broadcast message which connects said first network and said adjacent network; and representing a data path from said recording or reproducing device in said first network to a recording or reproducing device in said adjacent network after said recording and reproducing device in said adjacent network has responded to said second broadcast message, the representation of said data path including said relative address of said gateway connecting said first and adjacent networks and a relative address of said recording or reproducing device in said adjacent network which responded to said second broadcast message, and said data path being identified without having to identify with which of said plurality of audio-visual networks any particular device is associated.

8. The audio-visual network connection method according to claim 7 wherein the representation of said data path which uses said relative address of said recording or reproducing device in said second network which responded to said second broadcast message and said relative address of said gateway connecting said first and adjacent networks is formed by placing the relative addresses in a pre-determined order.

9. The audio-visual network connection method according to claim 7 further comprising the step of repeating the steps sending respective first add second broadcast messages, the modifying step, and the representing step for gateways and devices beyond said gateway connecting said first network and said adjacent network.

* * * * *

UNITED STATES PATENT AND TRADEMARK OFFICE
CERTIFICATE OF CORRECTION

PATENT NO. : 5,537,412                                   Page 1 of 2

DATED : July 16, 1996

INVENTOR(S) : Hisato SHIMA, Hiroshi YAMAZAKA, Kazuyuki OGAWA, Harumi KAWAMURA It is certified that error appears in the above-identified patent and that said Letters Patent is hereby corrected as shown below:

```
Col. 1, line 16, change "network" second occurence, to --device--
        line 17, change "device" first occurence, to --network--
        line 57, change "paths" to --path--
        line 59, change "passes" to --paths--
Col. 2, line 38, after ""1"" delete ","
        line 46, after "the" second occurence, insert -- network--
        line 47, after "the" second occurence, insert --network--
Col. 3, line 9, delete ","
        line 12, delete "as"
        line 17, after ""1"" delete ","
        line 22, delete ","
        line 29, after ""1"" delete ","
        line 33, delete "it"
        line 48, delete "it"
        line 52, after "message" insert --and--
Col. 4, line 4, after "message" insert --and--
Col. 5, line 22, change "path" to --paths--
```

UNITED STATES PATENT AND TRADEMARK OFFICE
CERTIFICATE OF CORRECTION

PATENT NO. : 5,537,412

DATED : July 16, 1996

INVENTOR(S) : Hisato SHIMA, Hiroshi YAMAZAKA, Kazuyuki OGAWA, Harumi KAWAMURA It is certified that error appears in the above-identified patent and that said Letters Patent is hereby corrected as shown below:

In the Claims

Col. 8, line 9, change "add" to --and--.

Signed and Sealed this

Eighteenth Day of March, 1997

Attest:

BRUCE LEHMAN

Attesting Officer

Commissioner of Patents and Trademarks